3,408,318
SACRIFICIAL ZINC COATING COMPOSITIONS
Ralph Eugene Madison, Louisville, Ky., assignor to
 Celanese Coatings Company, New York, N.Y., a
 corporation of Delaware
No Drawing. Continuation-in-part of application Ser.
 No. 95,044, Mar. 13, 1961. This application Mar. 17,
 1966, Ser. No. 535,047
5 Claims. (Cl. 260—18)

This is a continuation-in-part of my co-pending applications, Ser. No. 95,044 filed Mar. 13, 1961, now abandoned, and Ser. No. 411,703, filed Nov. 17, 1964, now abandoned.

This invention pertains to industrial coatings. More particularly, the invention pertains to zinc coatings which are used for protecting iron, steel and other ferrous metals from corrosion by electrolytic attack.

Zinc has long been used for the protection of metal surfaces, for instance in galvanizing, sheradizing, etc. Zinc compounds have also been useful as components in pigments due to their decorative and protective properties. This invention, however, is concerned with coating compositions employing comminuted zinc as a sacrificial metal, the zinc particles generally being so small that the zinc is referred to as a zinc dust or powder. Zinc particles are usually made either by atomization of the molten metal with a blast of air or by rapid condensation of zinc vapors. Leafed or flaked zinc powder is also used. Comminuted zinc coating compositions have the advantage over hot dip galvanizing in that structures may be coated in place.

Comminuted zinc coating compositions are normally classified as organic coating compositions and inorganic coating compositions. Organic zinc coatings include both extended zinc coatings and zinc rich coatings. Zinc rich coatings contain 92 to 95 percent by weight of the zinc dust in the dried film, whereas in extended zinc coatings, the zinc dust often is extended with other pigments such as zinc oxide. Extended zinc dust coatings generally contain 80 to 90 percent zinc dust and 20 to 10 percent zinc oxide at 92 to 95 percent pigment concentration in the organic medium. Many types of media have been used in connection with extended zinc and zinc rich coatings, for example, polystyrene plasticized with chlorinated diphenyl, chlorinated rubber plasticized with chlorinated wax, polyvinyl acetate, and isomerized rubber without a plasticizer, linseed oil and the like.

Inorganic zinc coatings consist of water soluble silicates, silicate esters, or organic silicates that are highly filled with zinc, for instance, zinc filled ethyl or sodium silicates. While zinc rich organic coating compositions dry by oxidation, evaporation or catalytic curing, inorganic zinc coating compositions are generally cured by the application of a curing agent as a second application or coat. Curing solutions containing sodium phosphate, sodium bicarbonate, potassium acid sulfate, zinc chloride, calcium chloride and many other treating agents are used for this purpose. Sea water is also useful particularly for coatings applied as linings of tankers, or ships' bottoms.

This invention pertains to modified anti-corrosive industrial coating compositions. Particularly, this invention relates to inorganic type zinc coating compositions modified with a small amount of organic film forming resin. More particularly, this invention pertains to zinc coatings containing both Portland cement and a polyepoxide resin.

Australian Patent Number 113,891 describes zinc coating compositions prepared from a mixture of zinc and hydraulic cement, such as Portland cement. These coatings are said to be particularly useful as anti-corrosive linings for iron and steel pipes. The coatings are applied to the metal surface in the form of an aqueous slurry of the zinc and Portland cement, and the protective coating is formed by the hydrolysis of the cement.

Australian Patent Number 113,891 further describes zinc-cement coatings which are modified by the incorporation of a drying oil (e.g. boiled linseed oil) in the mixture. The drying oil serves as a dispersion medium for the zinc and cement before application as a coating, and becomes part of the coating after the mixture is applied to the surface.

Coatings made from Portland cement and zinc provide wear and corrosion resistance. However, such coatings are brittle and are somewhat lacking in adhesion to the metal substrate. The coatings when subjected to impacts have a tendency to chip away from the surface. The use of drying oils in admixture with the zinc and cement provide coatings with somewhat improved impact resistance. However, drying oils have poor resistance properties and in general they weaken the overall utility of the zinc-cement coatings. Furthermore, the amount of drying oil used must be controlled so as not to prevent the cement from curing by hydrolysis.

The compositions of this invention are made from an intimate mixture of a Portland cement binder and comminuted zinc in a solution of a film forming polyepoxide resin and an organic solvent, the weight ratio of cement to zinc being 1:1 to 1:8, the amount of film forming resin being 1 to 10 weight percent based on the cement-zinc resin mixture, and the amount of solvent being sufficient to confer application properties on the composition.

The compositions of this invention have good adherence to the substrate, exhibiting improved resistance to chipping. The coatings have excellent resistance to corrosion and are capable of being overcoated with conventional top coat paints with no delamination of the coats or lifting of the undercoat from the substrate.

In the compositions of this invention, the cement is considered to be the primary binder and it cures by the known process of hydration. The zinc metal particles in admixture with the cement are bound together in approximately the same way as sand in a Portland cement concrete mix containing sand as the aggregate. While there might be a slight sensitivity of the zinc toward the cement, it is of minor importance in coating compositions of this type which are made of a dense concentration of metallic zinc particles firmly held or bound in a substantially inorganic cementitious hydraulic matrix.

The Portland cement used in these compositions includes regular or white Portland cement as well as high early strength cements. In addition, other Portland cements such as Lumnite cement and the like can be used, Lumnite cement being Portland cement high in calcium aluminate.

In preparing the zinc-cement coating compositions, the zinc should be present in sufficient quantity for the zinc particles to be in contact with one another and with the steel or iron base. Cathodic protection is best obtained at conductive ratios of zinc to cement. Preferred ratios of zinc to cement are 2:1 to 4:1. The weight of zinc should be at least equal to the weight of cement. Good results are obtained using up to about 8 parts of zinc to 1 part of cement. Zinc to cement ratios higher than 8:1 form cured films, but no particular advantage results from the use of such high zinc levels.

The compositions of this invention contain in addition to the zinc and cement, an organic film-forming resin. The resin functions as an initial film-forming binder which protects the primary binder (the cement) until the cement has cured. The resin which forms a film upon application holds the cement and zinc in place until the cement cures through the somewhat slow hydration process. Since moisture is required for this hydration process, the film-forming resin prevents the cement from being washed from the surface when water is applied.

In this composition, the resin, zinc and cement are mixed through the use of sufficient solvent to confer good application properties on the composition. On application of the composition, a film comprising the organic film-forming binder, the zinc and cement forms on evaporation of the solvent. After evaporation of solvent, the coating, if subjected to water, humidity or an aqueous curing solution, will cure or harden to bring about the chemical conversion of the film to a water insoluble state due to the hydration of the cement or primary binder. Due to the curing of the cement, unlike conventional organic coatings, this composition becomes insoluble in organic solvents. Hence, although the product started as an organic type composition, it is now primarily an inorganic composition since it is resistant to strong organic solvents whereas zinc rich organic coatings are not.

The films provided by this invention can be cured in any number of ways. For example, water can contact the film in the form of rain, by brushing, spraying or inundating. Water can be applied per se, as sea water, or as an aqueous solution containing various amounts of calcium chloride, zinc chloride, sodium bicarbonate, sodium sulfate, sodium chloride, carbonate and the like with or without a water soluble wetting agent stable in the presence of bivalent or trivalent ions. The inclusion of the cement as a binder allows for deliberate acceleration of curing if desired, but it will also take place naturally on exposure. In the meantime, even though the cement is uncured, the film is not sensitive to attack by rain water and the like because of the organic binder. This composition is, therefore, very suitable for exterior surfaces such as bridges, dam gates and the like.

The organic binder in these compositions is used in an amount of from about 1 to about 10 weight percent based on the zinc-cement-resin mixture with the preferred amount being about 5 to about 10 percent. If more than 10 percent resin is used, the cure of the cement is impeded. The resin coats the cement and prevents moisture from contacting the cement. The cement is prevented from hydrolyzing and poorly cured, weak films result.

The orgnaic binders used in these compositions are film-forming epoxide resins containing more than one 1,2 epoxy group per molecule. Particularly preferred epoxide resins are glycidyl polyethers of polyhydric phenols, having epoxide equivalent weights of about 180 to about 4000. Such glycidyl polyethers are prepared by reacting epichlorohydrin with polyhydric phenols. Examples of polyhydric phenols include p,p'-dihydroxydiphenyl propane, dihydroxydiphenyl methane, dihydroxydiphenyl sulfone, dihydroxydiphenyl ethane, dihydroxybenzophenone, resorcinol, hydroquinone, dihydroxynaphthalene, and novolak resins made by reacting a phenol and an aldehyde. Additional polyepoxides are glycidyl polyethers of aliphatic polyols, examples of polyols being ethylene glycol, 1,4 butanediol, trimethylol propane, trimethylol ethane, pentaerythritol and the like. Other polyepoxides include epoxidized hydrocarbons and hydrocarbon esters. Examples are epoxidized polymers and copolymers of butadiene, epoxidized vegetable oils and epoxidized cycloaliphatic hydrocarbons.

As has been stated hereinbefore, the zinc-cement-epoxide resin compositions have excellent corrosion resistance and adhesion properties. However, the resistance and adhesion properties can be improved by the incorporation of an epoxide resin curing agent into the compositions. This improvement is particularly noted when the zinc-cement coatings are overcoated with a conventional top coat paint. Excellent intercoat adhesion and no lifting of the undercoat is observed. The cured epoxide resins impart superior solvent resistance and superior adhesion to the coatings. Useful epoxide resin curing agents are polyfunctional amines, i.e., amines which have more than two amine hydrogens per molecule. Examples of such amines are ethylene diamine, diethylene triamine, triethylene tetramine, tetraethylene pentamine, pentaethylene hexamine, hexamethylene diamine, imino-bis-propylamine and the like. Additional curing agents are polyamido-amines which contain an average of more than two amine hydrogens per molecule. Polyamido-amines are prepared by reacting a polyfunctional amine, as described above, with mono- or poly-functional organic acids wherein the amine hydrogen equivalents are in excess of the acid equivalents. Suitable acids are fatty acids containing 12 to 24 carbon atoms and polymerized fatty acids, e.g., the so-called dimer and trimer acids. The curing agents are used in the proportions of about 0.5 to 2 amine hydrogens for each epoxide group of the epoxy resin.

The organic solvents used with the compositions of this invention are well-known solvents for epoxy resins. Useful solvents are those which contain no groups reactive with the epoxy resins, cement or zinc under the conditions used herein. Such solvents include aromatic hydrocarbons, ketones, ethers, esters, alcohols, ether-alcohols, ester-alcohols and mixtures of the above. Particularly useful solvents are xylene, toluene, coal-tar naphtha, benzene, methyl isobutyl ketone, 2-ethoxy ethanol, diacetone alcohol and 2-ethoxy ethyl acetate. The amount of solvent to be used will vary somewhat depending upon the method to be used for applying the composition as a coating. For example, more solvent will be used when the composition is to be applied as a spray than when it is to be brushed. The amount of solvent is best described as the amount sufficient to confer application properties on the composition.

In the compositions of this invention, other metals can be used in lieu of zinc to afford electrolytic protection, such metals being some of those above iron in the Electromotive Series of Elements. Suitable metals are cadmium, nickel, tin, lead, chromium and manganese. These metals can be used alone or in admixture with zinc to provide compositions adaptable as protective coatings for substrates in a wide variety of corrosive environments.

Other ingredients can be used in the compositions of this invention, such as mason's lime, aluminum stearate, calcium chloride, organic and inorganic pigments, as well as sand and other forms of silica or silicates. In the mixtures formed, the zinc and cement are the major components, amounting usually to at least about 75 weight percent and preferably about 75 to 99 weight percent, on a solids basis, of the total weight of the coating substituents.

This invention can best be illustrated by reference to the following examples. The polyepoxides used in the following examples are prepared by the condensation of varying proportions of epichlorohydrin to p,p'-dihydroxydiphenyl propane (Bisphenol A) and subsequent dehydrohalogenation. Epoxide A is a polyepoxide with an epoxide equivalent of 3000, prepared by reacting epichlorohydrin with Bisphenol A using a ratio of 5 mols of epichlorohydrin to 4 mols of Bisphenol A and then further reacting the resulting polyepoxide with 7¾ percent additional Bisphenol A. Epoxide B, having an epoxide equivalent of 250, is prepared by reacting epichlorohydrin with Bisphenol A, using a ratio of 2.6 mols of epichlorohydrin to 1 mol of Bisphenol A. Epoxide C is a polyepoxide with an epoxide equivalent of 1800, prepared by reacting epichlorohydrin with Bisphenol A using a ratio of 5 mols of epichlorohydrin to 4 mols of Bisphenol A and then further reacting the resulting polyepoxide with 5 percent additional Bisphenol A. While cold rolled steel panels were used for convenience in the following laboratory tests, equivalent results are obtained on sand blasted hot rolled steel most encountered industrially.

The bare strip on all panels described in the following examples is a ¼″ wide exposed strip made with tape so the taped portion of the panel is not coated. The scribes are made in the form of an X with a stylus. The salt spray tests are all of the 95° F., 5 percent, continuous fog type. Parts, where used, are parts by weight.

Example 1

| Materials: | Parts by wt.: |
|---|---|
| Metallic zinc dust | 227.00 |
| White Portland cement | 113.50 |
| Epoxide A (40 weight percent solution in 2-ethoxyethanol) | 52.74 |
| Epoxide B (90 weight percent solution in 2-ethoxyethanol) | 12.96 |
| Butoxyethanol | 7.91 |
| 2-ethoxyethanol | 75.26 |
| Xylene | 79.70 |

In suitable mixing equipment, the above materials in the corresponding parts by weight are mixed together until a uniform mixture results, which is free from lumps. The resulting mixture when applied to steel panels in films 5 mils in thickness, and dried 24 hours at 77° F., forms films which are extremely hard and have outstanding adhesion.

In order to test this composition, 5 mil films are formed on both sides of a steel panel. One side of the steel panel is then overcoated with conventional green paint top coat. Scribes and scratches are made on the unpainted side of the panel and the panel is then water soaked for a month. Since the water soak test proved not to be severe enough, the same panel is then prepared for a ten day salt spray test. Any tarnished spotse in the strip and scribes are polished and on the other side, overcoated with green paint, new scribes are made. After the ten day salt spray test. Any tarnished spots in the strip and scribes are scribes are clear with no evidence of rust.

Example 2

| Materials: | Parts by wt: |
|---|---|
| White Portland cement | 170.25 |
| Zinc | 510.75 |
| Quaternary ammonium bentonite | 2.83 |
| Epoxide A (40 weight percent solution in 2-ethoxyethanol) | 52.74 |
| Epoxide B (90 weight percent solution in 2-ethoxyethanol) | 12.96 |
| 2-ethoxyethanol | 75.26 |
| Butoxyethanol | 7.91 |
| Xylene | 79.70 |

In a suitable vessel, the above materials in the corresponding parts by weight are mixed together to produce a paint of brushable consistency. The resulting paint mixture is then applied by brush to steel panels. The organic zinc coating composition is air dried for 24 hours. The coated panels are then subjected to 10 days exposure to salt water spray. The results show no evidence of rusting.

Example 3

To suitable mixing equipment are added 6.18 parts of xylene, 11.88 parts of a 50 weight percent solution of Epoxide C in 2-ethoxyethanol, 0.55 part of a paraffin wax having a melting point of 127° C. to 131° C., 4.56 parts of 2-ethoxyethanol, 1.5 parts of n-butanol and 0.3 part of finely divided silica (Cab-O-Sil). The components are mixed for about 15 minutes to obtain a uniform mixture. 1.65 parts of a 90 weight percent solution of Epoxide B in 2-ethoxyethanol, 18.3 parts of Portland cement, 1.0 part of lead chromate, 0.98 part of molybdate orange and 52.55 parts of zinc dust are added and mixed for 20 minutes.

An epoxide resin curing solution is prepared by dissolving in 10.98 parts of 2-ethoxyethanol and 61.79 parts of xylene, 27.29 parts of an amino-amide prepared from a dimerized unsaturated fatty acid and a polyalkylenepolyamine and having an amine value of 216, a viscosity at 75° C. of 35 poises and a specific gravity at 25° C./25° C. of 0.99.

To 4 parts by volume of the zinc-cement-epoxide resin composition are added 1 part by volume of the epoxide resin curing solution. After thoroughly mixing the components, the resulting composition is sprayed on clean steel panels to a coating thickness of 7 mils. After drying overnight, the films exhibit excellent resistance to methyl isobutyl ketone. Excellent adhesion is obtained between these films and conventional top coat paints, such as those based on epoxide resins, vinyl polymers, alkyds and epoxy esters. No evidence of delamination and film failure is observed.

Example 4

Using the same procedure as described in Example 3, a paint is made from 1.65 parts of a 90 weight percent solution of Epoxide B in 2-ethoxyethanol, 11.88 parts of a 50 weight percent solution of Epoxide C in 2-ethoxyethanol, 0.10 part of phthalocyanine blue pigment, 1.88 parts of medium chrome yellow pigment, 0.3 part of finely divided silica, 0.8 part of hydrogenated castor oil, 0.55 part of polyethylene wax, 5.93 parts of xylene, 4.56 parts of 2-ethoxyethanol, 1.50 parts of butanol, 18.3 parts of Portland cement and 52.55 parts of zinc.

To 500 parts of the paint are added 46 parts of the epoxide resin curing agent described in Example 3. After thoroughly mixing the components, the resulting composition is sprayed on clean steel panels to a coating thickness of 7 mils. After drying overnight, the panels are soaked in methyl isobutyl ketone for 2 hours. The film is softened slightly, but recovers completely when removed from the solvent. Excellent adhesion is obtained between these films and conventional top-coat paints. The films when subjected to salt spray exhibit excellent corrosion resistance.

It is to be understood that the foregoing detailed description is given merely by way of illustration and that many variations may be made therein without departing from the spirit of the invention.

The embodiments of the invention in which an exclusive property or privilege is claimed are defined as follows:

1. A corrosion resistant paint comprising an intimate admixture of a Portland cement binder and zinc dust in a solution of a film-forming polyepoxide resin, wherein the polyepoxide resin contains more than one 1,2 epoxide group per molecule and is a glycidyl polyether of p,p′-dihydroxydiphenyl propane and an organic solvent for the polyepoxide resin, wherein the organic solvent contains no groups reactive with Portland cement, zinc and the polyepoxide resin, the weight ratio of cement to zinc being 1:1 to 1:8, the amount of film-forming resin being 1 to 10 weight percent based on the weight of the cement-zinc-resin mixture, the amount of solvent being sufficient to confer application properties on the composition, and wherein said paint is substantially free of water.

2. An article comprising a structure having thereon a coating comprising the cured composition of claim 4.

3. The composition of claim 1 wherein the polyepoxide resin has an epoxide equivalent weight of 180 to 4000.

4. The composition of claim 1 which includes as a curing agent for the polyepoxide resin a polyfunctional amine or a polyamido-amine.

5. The composition of claim 4 wherein the curing agent is a polyamido-amine prepared from a dimerized fatty acid and a polyalkylene-polyamine.

References Cited

UNITED STATES PATENTS

| | | | |
|---|---|---|---|
| 3,110,691 | 11/1963 | Fisher | 260—18 |
| 3,056,684 | 10/1962 | Lopata et al. | 117—160 |
| 3,198,758 | 8/1965 | Donnelly | 117—132 |

FOREIGN PATENTS

| | | |
|---|---|---|
| 113,891 | 10/1941 | Australia. |
| 947,754 | 1/1964 | Great Britain. |

OTHER REFERENCES

J. E. O. Mayne, Journal of the Iron and Steel Institute, February, 1954, pp. 140–143 relied upon.

H. Lee and K. Neville, Epoxy Resins, McGraw Hill Book Co., New York, 1957. pp. 17–20, 150 and 151 relied upon.

JULIUS FROME, *Primary Examiner.*

M. LIEBMAN, J. E. CALLAGHAN,
*Assistant Examiners.*